United States Patent [19]

Miyashita et al.

[11] 4,403,161
[45] Sep. 6, 1983

[54] PERMANENT MAGNET ROTOR

[75] Inventors: Kunio Miyashita, Hitachi; Seizi Yamashita, Katsuta; Hiroshi Watanabe, Hitachi; Shoji Tanabe, Sakura, all of Japan

[73] Assignee: Hitachi, Ltd., Tokyo, Japan

[21] Appl. No.: 188,098

[22] Filed: Sep. 17, 1980

Related U.S. Application Data

[63] Continuation of Ser. No. 915,139, Jun. 13, 1978, abandoned.

[30] Foreign Application Priority Data

Jun. 24, 1977 [JP] Japan ................................ 52-74388

[51] Int. Cl.³ ............................................ H02K 21/12
[52] U.S. Cl. .................................................. 310/156
[58] Field of Search ....................... 310/156, 162–165, 310/261, 211

[56] References Cited

U.S. PATENT DOCUMENTS

| | | | |
|---|---|---|---|
| 2,193,675 | 3/1940 | Merrill | 310/156 |
| 3,492,520 | 1/1970 | Yates | 310/162 |
| 3,743,873 | 7/1973 | DeJong | 310/156 X |
| 3,775,626 | 11/1973 | Burgbacher | 310/162 X |
| 4,144,469 | 3/1979 | Miyashita et al. | 310/156 |

Primary Examiner—Donovan F. Duggan
Attorney, Agent, or Firm—Antonelli, Terry & Wands

[57] ABSTRACT

A permanent magnet rotor used in a synchronous motor or the like comprising a shaft, an iron core and permanent magnets is disclosed. Each of the permanent magnets which is mounted on the hollow rotor core has an arc shape, and the radial center of the arc shape is positioned on the axis of the shaft or at a point slightly deviated from the shaft axis.

12 Claims, 3 Drawing Figures

PERMANENT MAGNET ROTOR

This is a continuation of application Ser. No. 915,139 filed June 13, 1978, now abandoned.

LIST OF PRIOR ART REFERENCES

The following reference is cited to show the state of the art:

U.S. Pat. No. 3,492,520 W. W. Yates, Jan. 27, 1970, Cl. 310-261.

The present invention relates to a permanent magnet rotor for a rotary machine, and more particularly to a rotor which employs a permanent magnet as a means for producing magnetic flux.

Many prime movers and synchronous motors use permanent magnets to provide field excitation.

An example of the permanent magnet rotor is shown in U.S. Pat. No. 3,492,520, in which a pair of slabs of ferrite permanent magnets are individually disposed between inner and outer pole pieces. In this structure, since the width of the rotor core which is interposed between conductor bars and the permanent magnets is wider at the pole end than at the pole center, it is difficult to pass the magnetic flux therethrough. Accordingly, since the rotary magnetic flux does not pass through the rotor smoothly at the time of starting, a large starting current is required.

Furthermore, the width of a portion of the rotor core which is interposed between the shaft and the permanent magnets is wider at the pole end than at the pole center. As a result, since a reluctance does not substantially increase even if a pulsating magnetic flux is concentrated at the pole end, the pulsating magnetic flux is easy to pass therethrough. Accordingly, a large eddy current loss is produced by the pulsating magnetic flux developed in the permanent magnets. In addition, since the permanent magnets are in the shape of flat slabs, the effective sectional area is small and the amount of magnetic flux is small.

It is a main object of the present invention to provide a permanent magnet rotor which can pass a large amount of magnetic flux therethrough and can improve the efficiency and power factor.

It is another object of the present invention to provide a permanent magnet rotor which can easily pass the rotary magnetic field at the time of starting to improve a starting characteristic.

It is another object of the present invention to provide a permanent magnet rotor which can pass the magnetic flux uniformly and smoothly to provide a smooth torque.

It is another object of the present invention to provide a permanent magnet rotor which can reduce the pulsating magnetic flux to provide a small high frequency pulsating flux density.

It is a further object of the present invention to provide a permanent magnet rotor which has a small eddy current loss due to a pulsating magnetic flux.

Those and other objects, features and advantages of the present invention will be apparent from the following detailed description of the preferred embodiments of the invention when taken in conjunction with the accompanying drawings, in which.

According to the present invention, there is provided a permanent magnet rotor comprising a hollow rotor core, a shaft disposed at the center of the rotor core and extending axially thereof, arc-shaped permanent magnets disposed within the rotor core and extending axially of the rotor core and the shaft, and slits disposed between the ends of the permanent magnets to prevent short circuiting of magnetic flux.

Figure 1:
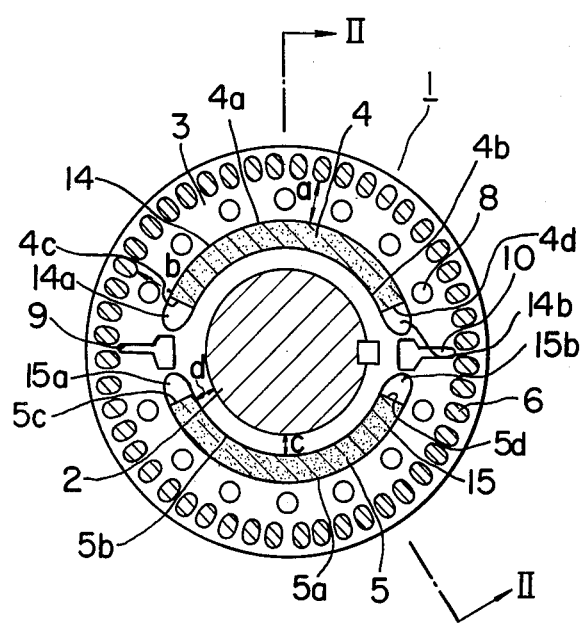
FIG. 1 is a cross-sectional view of a two-pole permanent magnet rotor according to an embodiment of the present invention.
Figure 2:
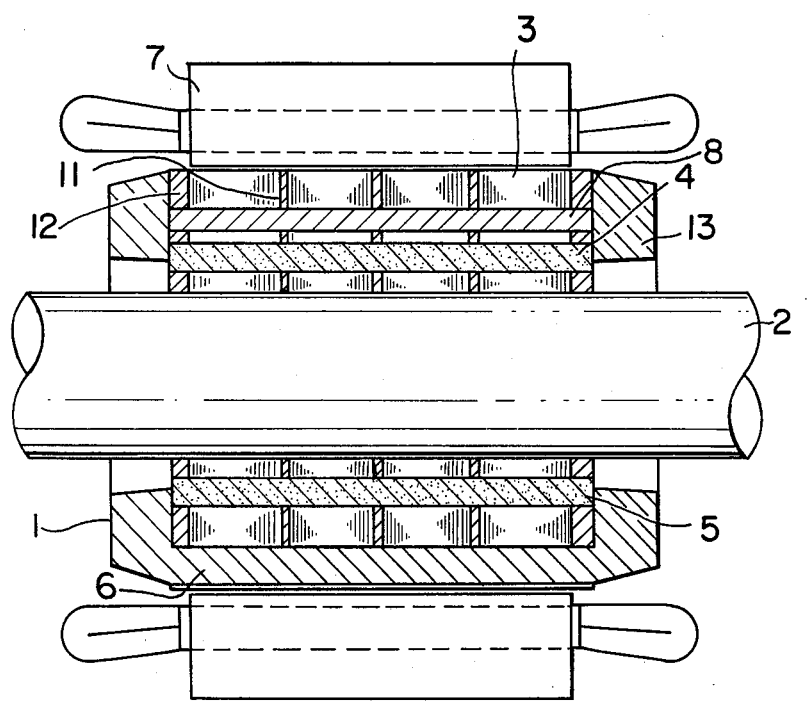
FIG. 2 is a side cross-sectional view of the rotor taken along a line II—II in FIG. 1.

Referring to the accompanying drawings, the preferred embodiments of the present invention will be explained in detail. FIGS. 1 and 2 show an embodiment of the rotor of the present invention which is applied to a two-pole permanent magnet synchronous motor of approximately 1 kW for use in a spinning machine.

A permanent magnet rotor 1 comprises a shaft 2, a hollow iron core or laminated iron stack 3 disposed around the shaft 2, and two arc-shaped plates of ferrite permanent magnets 4 and 5 disposed within the iron core 3. The permanent magnets 4 and 5 are disposed in a balanced manner within the iron core 3 which supports a plurality of axially extending conductor bars 6, which form a squirrel cage on the rotor 1 as shown in FIG. 1, the conductor bars are arranged to be positioned at substantially the same distance from the outer peripheral surfaces of the permanent magnets 4 and 5. A stator 7 of a conventional construction is disposed around the rotor 1 in a conventional manner. A plurality of iron pins 8 are disposed between the permanent magnets 4 and 5 and the conductor bars 6. The iron pins 8 are used to impart mechanical strength to the iron core 3. Slits 9 and 10 are formed between the ends of the permanent magnets 4 and 5 in order to prevent short circuiting of magnetic flux. A plurality of non-magnetic rings 11 are disposed in the iron core 3. End plates 12 and end rings 13 are provided at the ends of the iron core 3.

The permanent magnets 4 and 5 are disposed in arc-shaped slots 14 and 15 which are formed in the iron core 3 symmetrically with respect to the shaft 2 each of the slots 14 and 15 is formed by holes of individual iron plates of the stack when assembled into the stack. The slots 14 and 15 extend substantially along the circumference of the shaft 2 so as to position their ends in the neghbourhoods of the slits 9 and 10. The permanent magnets 4 and 5 are substantially inserted in the slots 14 and 15 with providing spaces 14a, 14b and 15a, 15b at the ends of the slots 14 and 15. The spaces 14a, 14b, 15a and 15b are provided in the same configuration. Ends 4c, 4d and 5c, 5d of the permanent magnets 4 and 5 are linearly cut. Outer peripheral surfaces 4a and 5a and inner peripheral surfaces 4b and 5b of the permanent magnets 4 and 5 are arranged generally coaxially with the shaft 2. That is, the radial centers of the arc shapes of the permanent magnets 4 and 5 are positioned on the axis of the shaft 2.

The permanent magnets 4 and 5 are made of the arc-shaped plates and substantially mounted within the slots 14 and 15 of the core 3 with the spaces 14a, 14b, 15a and 15b. Accordingly, the effective cross-sectional area (the area perpendicular to magnetic fluxes) of the permanent magnets can be increased so that a large amount of magnetic flux is provided and hence a permanent magnet rotor 1 having a high efficiency and a high power factor can be attained.

Furthermore, since the width of the iron core 3 which is interposed between the conductor bars 6 forming the squirrel cage winding and the permanent magnets 4 and 5 is same at the center of the pole and at the end of the pole, (i.e. the width a at the center of the pole ≈ the width b at the end of the pole), the magnetic flux may easily pass through a wide portion of the rotor 1. Accordingly, when the magnetic flux passes through the rotor 1, rotating at a slip frequency at the time of start, the start current can be reduced. Further, since the magnetic flux passes through the rotor 1 uniformly and smoothly, a smooth torque can be produced.

A pulsating magnetic flux which passes through the permanent magnet generally passes through a portion of the laminated iron core which is interposed between the permanent magnet and the shaft. This is because the magnetic flux passes through the shaft only with difficulty because of skin effect since the shaft is bulky, and hence it concentrates in the iron core. In the present embodiment of the invention, since the width of a portion of the iron core 3 which is interposed between the shaft 2 and the permanent magnets 4 and 5 is the same at the center of the pole and at the end of the pole, (i.e. the width c at the center of the pole ≈ the width d at the end of the pole), the magnetic flux concentrates at the end of the pole so that the reluctance of this end portion increases to reduce the pulsating magnetic flux passing through the permanent magnets 4 and 5. Consequently, density of the high frequency pulsating magnetic flux which passes through the permanent magnets 4 and 5 can be reduced.

Moreover, since eddy current loss due to the pulsating magnetic flux generated in the permanent magnets 4 and 5 is reduced, the temperature of the permanent magnets 4 and 5 can be maintained low to prevent the reduction of the magnetic flux of the permanent magnets 4 and 5 due to temperature elevation.

Figure 3:
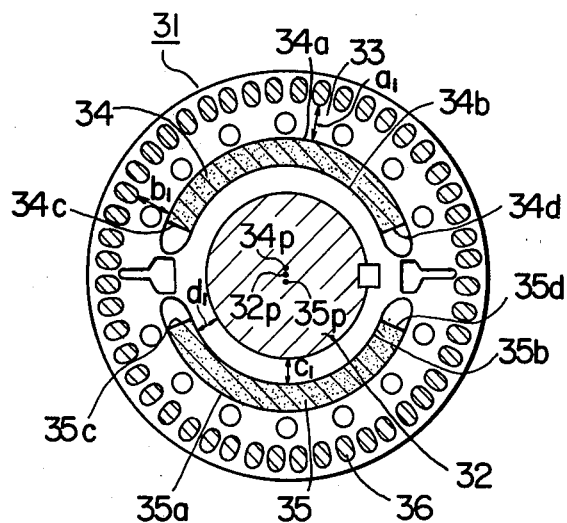
FIG. 3 is a cross-sectional view of a two-pole permanent magnet rotor according to another embodiment of the present invention.

Referring to FIG. 3, another embodiment of the present invention is explained. A permanent magnet rotor 31 of the present embodiment comprises a shaft 32, an iron core 33 and two arc-shaped ferrite permanent magnets 34 and 35 disposed in the iron core 33.

Outer peripheral surfaces 34a and 35a of the permanent magnets 34 and 35 are coaxial with inner peripheral surfaces 34b and 35b thereof but the radial centers of the arc shapes of the permanent magnets are not located on the axis of the shaft 32, but positioned as shown in FIG. 3. In the FIG, 34p and 35p designate the radial centers of the arc shapes of the permanent magnets 34 and 35, respectively, and 32p designates the center of the cross-section of the shaft 32, i.e. the axis of the shaft 32.

In this embodiment, since the width of a portion of the iron core 33 which is interposed between the conductor bars 36 forming the squirrel cage winding and the permanent magnets 34 and 35 is substantially the same at the center of the pole and at the end of the pole, the magnetic flux easily passes through a wide portion of the rotor 31. Accordingly, similarly to the previous embodiment, the start current can be reduced and a smooth torque can be generated.

Furthermore, since the width of a portion of the iron core 33 which is interposed between the shaft 32 and the permanent magnets 34 and 35 is narrower at the end of the pole than at the center of the pole (i.e., the width $c_1$ at the center of the pole > the width $d_1$ at the end of the pole), the pulsating magnetic flux passing through the permanent magnets 34 and 35 has a high magnetic flux density at the end of the pole so that a reluctance at that portion increases to reduce the pulsating magnetic flux which passes through the permanent magnets 34 and 35. Accordingly, similarly to the previous embodiment, the high frequency pulsating magnetic flux density can be reduced and eddy current loss due to the pulsating magnetic flux can be reduced.

Although a two-pole permanent magnet rotor has been described in the preferred embodiments, the present invention can be equally applied to a four-pole or six-pole permanent magnet rotor, and also, although a ferrite magnet has been shown as the permanent magnet, Alnico magnetic material may be used.

What is claimed is:

1. A permanent magnet rotor comprising:
   a hollow rotor core made of laminated iron stack having at least two slots formed therein;
   a shaft disposed at the center of said rotor core and extending axially thereof;
   a plurality of axially extending conductor bars disposed within said rotor core and arranged along a circle coaxial with said shaft, for forming a squirrel cage on said rotor core;
   arc-shaped permanent magnets disposed within said slots of said rotor core and extending axially of said rotor core and said shaft, a width of a portion of said rotor core which is interposed between said shaft and each of said arc-shaped permanent magnets being no longer at the end of the arc shape of said magnet than at the center of the arc shape of said magnet; and
   axially extending slits formed between the ends of said permanent magnets to prevent short circuiting of magnetic flux.

2. A permanent magnet rotor according to claim 1, wherein said conductor bars are arranged to be positioned at substantially the same distance from outer peripheral surfaces of said permanent magnets.

3. A permanent magnet rotor according to claim 1, wherein the inner and outer peripheral surfaces of said permanent magnets are arranged coaxially with said shaft.

4. A permanent magnet rotor according to claim 1, wherein the inner and outer peripheral surfaces of said permanent magnets are arranged coaxially with each other and the radial center of the arc shape of each of said permanent magnets is positioned at a point deviated from the axis of said shaft.

5. A permanent magnet rotor according to claim 4, comprising the feature that for each arc-shaped permanent magnet, the distance from each arc to its respective center is less than the distance from the said each arc to the said center of the said shaft.

6. A permanent magnet rotor according to claim 1, wherein the width of the portion of said rotor core which is interposed between said shaft and each of said arc-shaped permanent magnets at the end of the arc shape of said magnet is equal to that at the center of the arc shape of said magnet.

7. A permanent magnet rotor according to claim 1, wherein the width of the portion of said rotor core which is interposed between said shaft and each of said arc-shaped permanent magnets is smaller at the end of the arc shape of said magnet than at the center of the arc shape of said magnet.

8. A permanent magnet rotor comprising:

a hollow rotor core means made of laminated iron stack having at least two slots formed therein;

a shaft disposed at the center of said rotor core means and extending axially thereof;

a plurality of axially extending conductor bars disposed within said rotor core means and arranged along a circle coaxial with said shaft, for forming a squirrel cage on said rotor core means;

arc-shaped permanent magnets disposed within said slots of said rotor core means and extending axially of said rotor core means and said shaft, a portion of said rotor core means which is interposed and extending in a direction between said shaft and each of said arc-shaped permanent magnets being configured for enabling an increase of reluctance at the end portions of said arc-shaped permanent magnets and for enabling a small high frequency pulsating flux density to pass through said permanent magnets; and axially extending slits formed between the ends of said permanent magnets to prevent short circuiting of the magnetic flux.

9. A permanent magnet rotor according to claim 8, wherein the portion of said rotor core means is configured for enabling the permanent magnet rotor to have a small eddy current loss due to the pulsating magnetic flux.

10. A permanent magnet rotor according to claim 8 or 9, wherein the portion of said rotor core means is configured to be no larger at the end of the arc shape of said magnet than at the center of the arc shape of said magnet.

11. A permanent magnet rotor according to claim 10, wherein the portion of said rotor core means at the end of the arc shape of said magnet is equal to the portion of said rotor core means at the center of the arc shape of said magnet.

12. A permanent magnet rotor according to claim 10, wherein the portion of said rotor core means at the end of the arc shape of said magnet is smaller than the portion of said rotor core means at the center of the arc shape of said magnet.

* * * * *